Sept. 15, 1931.  E. D. EBY  1,823,731
VARIABLE CAPACITY RESERVOIR
Filed July 31, 1929
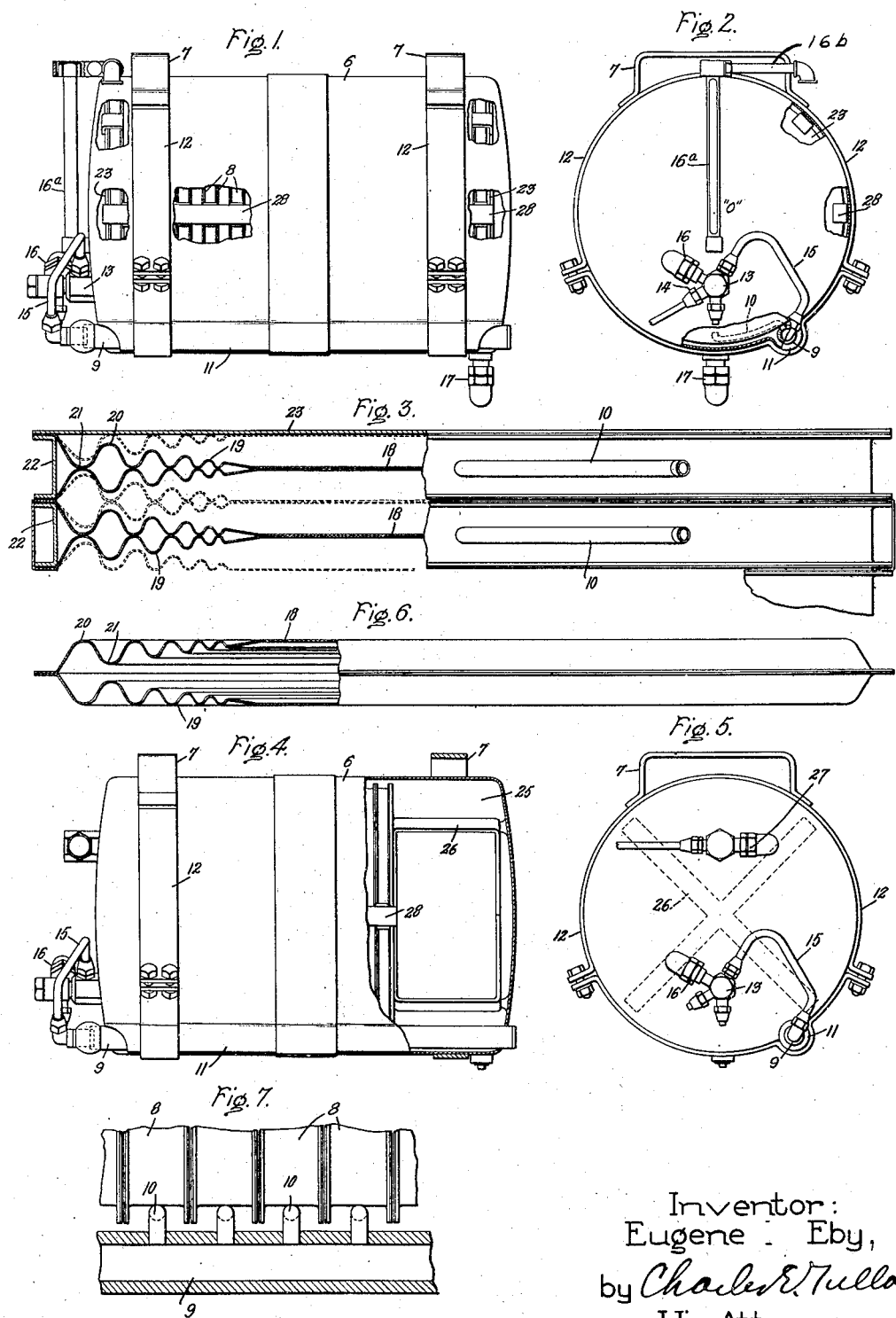
Inventor:
Eugene D. Eby,
by Charles E. Tullar
His Attorney.

Patented Sept. 15, 1931

1,823,731

UNITED STATES PATENT OFFICE

EUGENE D. EBY, OF PITTSFIELD, MASSACHUSETTS, ASSIGNOR TO GENERAL ELECTRIC COMPANY, A CORPORATION OF NEW YORK

VARIABLE CAPACITY RESERVOIR

Application filed July 31, 1929. Serial No. 382,462.

The present invention relates to variable capacity reservoirs such as are used to receive oil from a high tension underground electric cable as it heats and to feed it back as the cable cools, and which in brief comprise a container and a plurality of cellular elements arranged in a stack in the container.

The requirements of a reservoir for such purposes are particularly severe. First, the cells or elements must be vacuum tight; second, they must be capable of withstanding repeated applications of oil pressure of twenty pounds (more or less) per square inch above atmosphere without damage; and at the same time the rated displacement of the oil in the chamber must be obtained within a relatively small pressure range, such as from zero to one pound per square inch. In other words, each cell must be safe from damage through a pressure range from minus 15 pounds to plus 20 pounds but give full displacement within a range of one pound. Also the elements must be non-corrosive when in the presence of the atmosphere found in cable manholes.

The object of my invention is to provide a reservoir of improved construction which will meet all of the exacting requirements above mentioned and which shall be of such simple character that it can be manufactured in quantities at reasonable cost with the class of labor which is available for such work.

For a consideration of what I believe to be novel and my invention, attention is directed to the accompanying description and claims appended thereto.

In the drawings Fig. 1 is a view in elevation of a feeding reservoir; Fig. 2 is an end view of the same; Fig. 3 is an enlarged sectional view of one of the cellular elements; Fig. 4 is a view in elevation of a balanced type of reservoir; Fig. 5 is an end view of the same; Fig. 6 is a sectional view of a cellular element for the pressure type of reservoir; and Fig. 7 is a detail showing the connection between the manifold and the cells.

6 indicates a tank of suitable metal having closed curved ends and a pair of straps 7 by which it can be supported from above in a manhole or other suitable place. It contains a plurality of cellular elements 8 arranged in a stack having a common axis and held in position by the walls of the tank. All of the cells are connected to a manifold 9, as best shown in Figs. 2 and 7. From these figures and Fig. 3 it will be seen that the connection between each cell and the manifold is by means of a pipe 10 which is curved on about the same radius as the peripheral wall of the cell, has some flexibility to prevent injury due to vibration and slight movements and which is located within the channel shaped ring which forms the rim of the cell so as to reduce the diameter of the container. In order to reduce the diameter of the tank as much as possible, and it may be here stated that the space in a manhole is restricted and represents a high cost, the tank is provided with a swelled-out or enlarged portion 11 near its lower side and where it interferes as little as possible with other parts of the apparatus in which the manifold is located. The tank is also provided with two split supporting rings 12, the ends of which are united by clamping bolts. The supporting straps are welded to the rings.

One end of the tank is provided with a fitting 13 to which are attached connectors 14 to receive pipes leading to cable sections or to other tanks for connecting them in parallel. There is also a bent pipe 15 which leads to the manifold, and a connector 16 containing a suitable valve through which oil may be introduced. In the case of feeder type reservoirs, oil is put into the tank to a level marked "O" on the gauge 16a. As oil is forced into the cells from the cable, the oil level in the tank rises, indicating the displacement on the gauge whose markings are calibrated. As the interior of the tank is to be maintained at atmospheric pressure it is provided with a fitting 16b which has a downwardly extending outer end to prevent foreign matter from entering it, said parts constituting a breather. At the opposite end of the tank is a fitting 17 through which oil may be introduced into the tank.

As previously stated, the requirements of a cell are particularly severe as they must withstand a very considerable range of pressure and the walls thereof must be so flexible that they respond to very small changes of pressure and must be capable of bending back and forth for years without injury. After much experimental work I have determined that Monel metal is best adapted for the sides or walls of the cells and Everdur bronze for the rim, provided they are made as below described. The sides or disks are made of circular punchings and have a central flat portion 18 and an outer corrugated portion 19, said corrugations gradually getting deeper and of larger radius of curvature step-by-step toward the rim accompanied by an ever increasing pitch distance between corrugations. As arranged the tops 20 and bottoms 21 of the corrugations are defined between two diverging surfaces, one of which coincides with the flat part of the wall and the other extending from said flat part to the bottom of the rim. Although the corrugations have been defined as being located between two diverging surfaces some departure may be made therefrom without detriment. The companion wall of the cell is similarly constructed so that when collapsed due to the presence of a vacuum within the cell the central parts will contact as will also the corresponding low or bottom portions 21 of the corrugations. Thus the parts become mutually supporting under conditions of extreme minus pressure. When the disks are assembled on the rim or ring they occupy approximately the positions indicated in Fig. 3, that is to say, the flat portions and also the low portions of the corrugations are close together or they may be in contact. This figure also indicates the position of parts when a vacuum exists within the chamber of the cell. In dotted lines are indicated their respective positions when distended due to a positive pressure within the chamber.

The rims of the cells are made in the form of rings 22, the section of which is channel shape. To these rings are secured the disks or side walls by suitable means, electric welding has been found to afford the most satisfactory union of parts for the purpose. In assembling the cells are closely stacked in concentric relation in the tank so that the rims contact one with the other and with the end supports, and the center part of one cell contacting with a wall of an adjacent cell or with an end head of the tank or other support if it be an end cell.

When the oil pressure within each of the cells reaches the maximum, the walls of the cells on both sides move outwardly into contact with the walls of adjacent cells, and here again is found mutual support but in a slightly different manner. For the two end cells reliance is placed on two frame plates 23 suitably supported within the tank. The support or plates should engage the center of the cell and the high points of the corrugations when the walls are distended. As will be indicated by the above, the side walls of the cells are made of thin metal, so thin in fact that without the special arrangements which have been provided the cells would burst or be seriously damaged when subjected to the maximum pressure and would collapse or be seriously damaged when subjected to the minimum pressure. To state the matter in another way, a plurality of relatively weak cells is arranged in a stack and which on account of their flat centers and gradually enlarging corrugations prevent permanent deformation. As the pressure decreases each corrugation moves in a direction parallel to the axis until it meets a corresponding corrugation on the adjacent wall. After the corrugations touch further reduction of pressure serves only to force the walls of the cells more tightly against each other and without injury to the cell structure. When the pressure rises the high portions of the corrugations on one cell contact with similar portions in an adjacent cell. As arranged, approximately the full movement of the side walls or disks is accomplished by a change of internal pressure within the cells of only one pound per square inch.

In Figs. 4 and 5 is shown a balanced pressure reservoir or tank constructed as above described in connection with Figs. 1 and 2 except that no breather is provided and it is sealed tight. In the tank is a chamber 25 at one end in which there is a body of gas under sufficient pressure to balance an equivalent oil pressure within the cells. In this case the innermost cell is separated from the head by a frame 26. Gas under pressure is admitted to the tank by the valve 27 in suitable amount to fill the spaces not occupied by the cells, and to establish therein a positive predetermined pressure. This type is used where gas pressure is necessary to force oil out of the tank at the required rate whereas in the case of Fig. 1 the tank is of the feeder type and oil flows therefrom by gravity.

As previously stated, the cells are assembled as a stack within the container. In order that a set of these cells may be handled as a unit and to prevent injury to the manifold and to the connections leading from the cells to the manifold the cells are held together by numerous clamps or straps 28, Fig. 1, having turned-over ends which are soldered or otherwise secured to the end plates.

In Fig. 6 is shown a type of cell which is applicable for pressure reservoirs. In this case the cell is made of two similar punchings each having a flat central portion and corrugations arranged as described in connection with Fig. 3, but instead of containing oil fed from a manifold is completely sealed and contains a gas confined under a suitable pressure. The gas may advantageously be one that is readily absorbed by the oil, such as $CO^2$ or nitrogen, in case of injury to one or more of the cells. The disks used with this type of cell are identical in shape with those described in connection with Fig. 3 but their assembly is different. In Fig. 3 the disks are assembled with the low parts of the corrugations in contact and a supporting ring is provided, whereas in Fig. 6 the disks are reversed, no ring is provided, and the outer edges of the disks are united one to the other by suitable means, as electric welding for example. The tank used with this type would be a tightly closed tank filled with oil, fitted with a suitable valve and filling device. Connection of such a reservoir to oil-filled joints and terminals provides a supply of oil under positive pressure.

What I claim as new and desire to secure by Letters Patent of the United States is:—

1. A cellular element comprising a pair of disks which are united at their peripheries to form a chamber, each of said disks having a series of concentric corrugations which progressively increase in depth and radius of curvature toward their peripheries, the low portions of the corrugation on one disk being in concentric register with similar portions on the other disk so that when the disks occupy their inner positions the said low portions contact to form a mutual support for the disks, a container which completely encloses the element, and means located within the container with which the high portions of said corrugations engage to limit the outward movements of the walls of the disks.

2. A cellular element, comprising a pair of disks which are united at their peripheries to form a chamber, each of said disks having concentric corrugations which increase in depth and radius of curvature toward their peripheries, the high portions of the corrugations on each disk being in such relation with each other that when the disks occupy their expanded positions the said high portions contact with supporting plates adjacent to the disks or with the high portions of adjacent disks of similar cellular elements in close axial arrangement with the element, to form a mutual support for the disks.

3. A reservoir comprising a plurality of cellular elements arranged in a stack and having a common axis, each of said elements comprising a pair of concentrically corrugated disks which are united at their peripheries to form chambers, the corrugations in each disk increasing in depth and radius of curvature toward the periphery, the low portions of all of the disks being in concentric register so that as each pair of disks moves inwardly the low portions of the corrugations will contact to form a mutual support, and the high portions of all of the disks being in concentric register so that as the disks move outwardly the high portions will contact with similar portions on adjacent elements to also form a mutual support.

4. A cellular element comprising a pair of disks, each of which has concentric corrugations which increase in depth and radius of curvature toward the periphery, the high and low portions of the corrugations being in concentric register, said low portions limiting the inward movements of the disks, and a supporting ring having end flanges forming flat surfaces to which the disks are united at their peripheries to form a chamber, said ring also acting as a spacer for the peripheral edges of the disks.

5. A reservoir comprising a plurality of cellular elements arranged in a stack and having a common axis, each element comprising a pair of disks and a ring to which the disks are secured at their peripheries to form a chamber, said rings also acting to hold the elements in spaced relation, each of said disks having corrugations which are in concentric register, the corrugations increasing in depth and radius of curvature step-by-step toward the periphery so that as the disks move inwardly the low portions of the corrugations contact and as they move outwardly the high portions of each corrugation contact with corresponding portions on adjacent elements.

6. A cellular element comprising a pair of disks, each of said disks having a substantially flat central portion and concentric corrugations which increase in depth and radius of curvature from the central portion toward the periphery, the tops and bottoms of the corrugations being bounded by two diverging surfaces, one of which is substantially parallel with the central portion, and the other extending from the central portion toward the rim of the disk, and a ring having flanges presenting flat surfaces forming a support to which the peripheral portions of the disks are welded.

7. A cellular element comprising a pair of disks, each of said disks having a substantially flat central portion and concentric corrugations which increase in depth and radius of curvature from the central portion toward the periphery, the tops and bottoms of the corrugations being bounded by two diverging surfaces, one of which is substantially parallel with the central portion, and the other extending from the central portion toward the rim of the disks, and a ring holding the edges of the disks in spaced relation and united therewith and which with the disks defines the walls of a chamber.

8. In a reservoir, the combination of a container, a plurality of cellular elements therein arranged in a stack about a common axis, a channel shaped rim for each of the elements, a manifold, and conduits connecting the chamber in each cellular element to the manifold, which are located within the channels of the rims.

9. In a reservoir, the combination of a cylindrical container having a swelled-out longitudinal portion, a plurality of chambered elements in the container arranged in a stack about a common axis, a channel shaped rim for each of the elements, a manifold located in the swelled-out portion of the container, and relatively long curved conduits, each of which is located in one of the channels and connects the chamber in an element to the manifold.

10. In a reservoir, the combination of a cylinderical container, a plurality of chambered elements arranged in a stack therein in axial alignment, said elements having expansible walls, a manifold, conduits connecting the chamber of each of the elements with the manifold, and clamping means for holding the elements in their stacked arrangement to prevent injury to the said conduits.

11. In a reservoir, the combination of a container having a chamber, a plurality of similar chambered elements partly filling said chamber and arranged in a stack about a common axis, each of said elements comprising a pair of disks both having concentric corrugations increasing in depth and radius of curvature in like manner step-by-step from a central portion toward the periphery so that as the disks move inwardly the low portions of the corrugations contact and as they move outwardly the high portions of the corrugations contact with corresponding portions, means engaging the end disks to position the stacks and limit outward movements of the end disks, and a means whereby gas under pressure may be introduced to fill the portion of chamber of the container not occupied by said elements.

12. A reservoir comprising a container having a chamber, a plurality of cellular chambered elements therein arranged in a stack, each element comprising an annular rim and a pair of metal disks secured to the rim and having concentric corrugations increasing in depth and radius of curvature step-by-step toward the periphery, the disks being so thin and flexible as to give full displacement within a range of approximately one pound difference of pressure between the inside and the outside of the element, the central part of the disks and the opposed corrugations of each element contacting upon a predetermined increase of external pressure, said central parts and corrugations of one element contacting with similar parts of other elements upon a predetermined increase of internal pressure, means supported by the walls of the container for limiting the outward movements of the elements located at the ends of the stack, and conduit means for admitting fluid to and receiving it from said elements in parallel.

In witness whereof, I have hereunto set my hand this twenty-ninth day of July, 1929.

EUGENE D. EBY.